No. 638,189. Patented Nov. 28, 1899.
F. C. SOPER.
MACHINE FOR GRINDING PRISM LIGHTS.
(Application filed Feb. 2, 1898.)
(No Model.) 2 Sheets—Sheet 1.
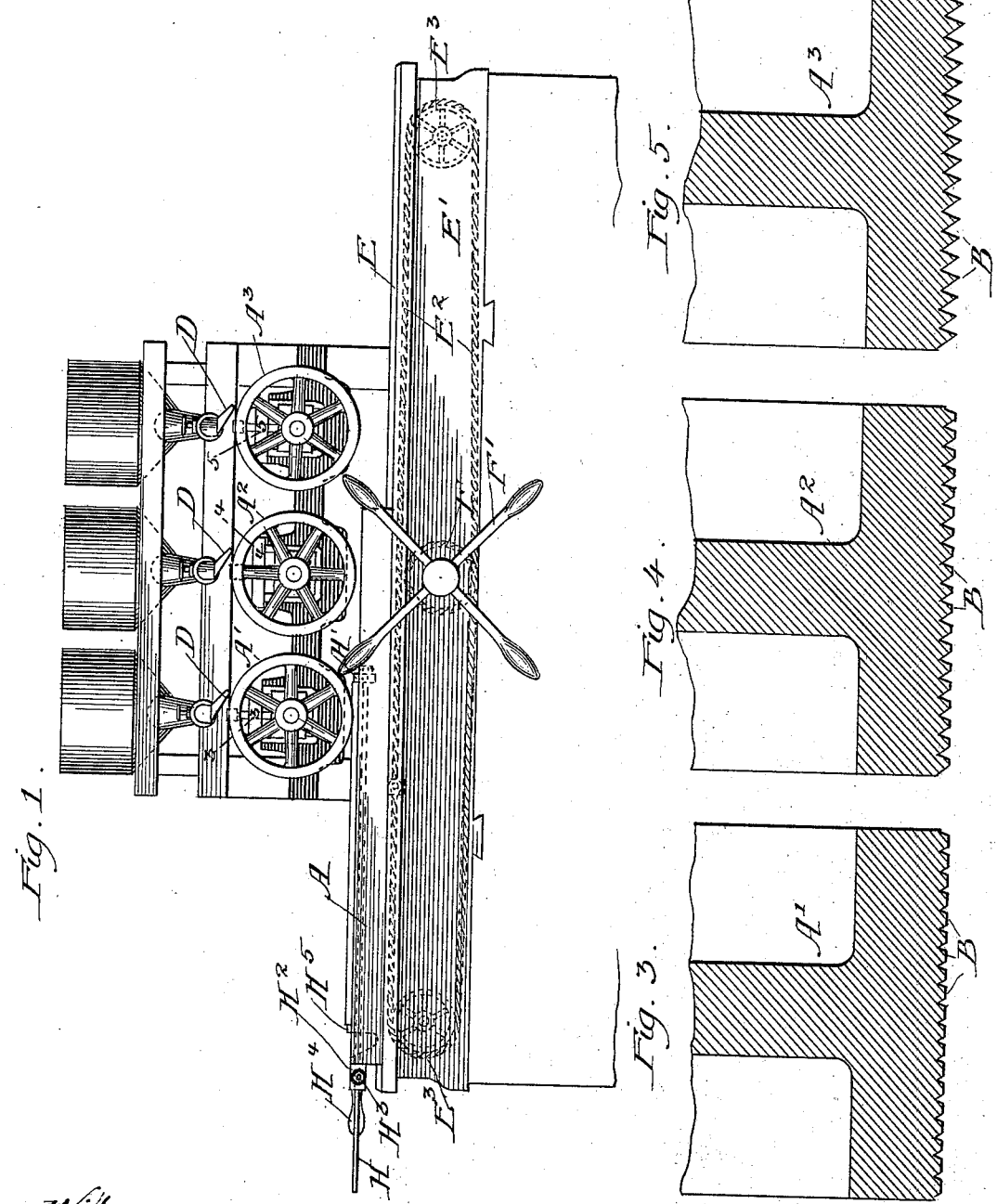
Witnesses:
Frank S. Blanchard
Donald M. Carter
Inventor:
Frank C. Soper.

No. 638,189. Patented Nov. 28, 1899.
F. C. SOPER.
MACHINE FOR GRINDING PRISM LIGHTS.
(Application filed Feb. 2, 1898.)
(No Model.) 2 Sheets—Sheet 2.
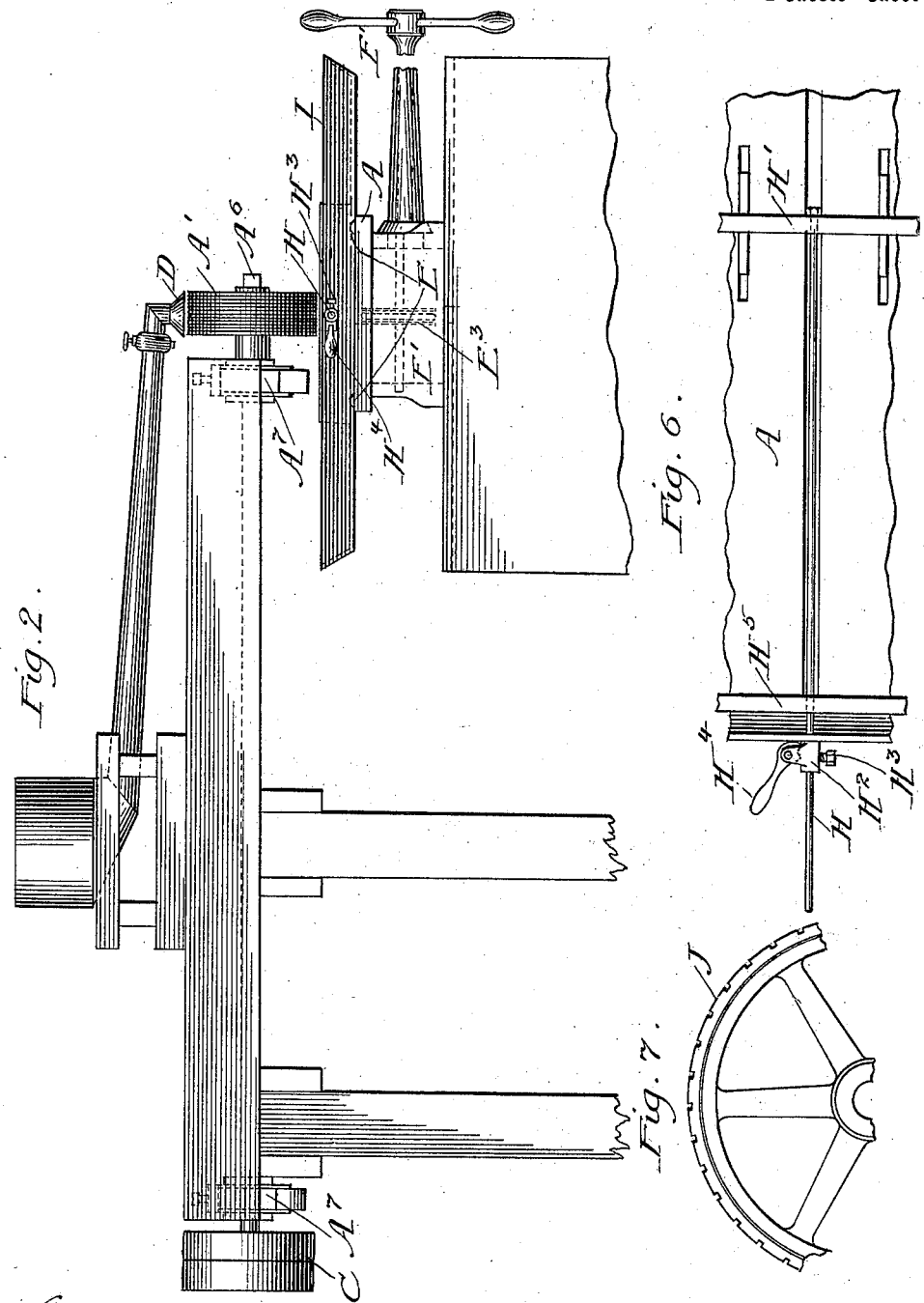
Witnesses
Frank S. Blanchard
Donald M. Carter
Inventor:
Frank C. Soper.

United States Patent Office.

FRANK C. SOPER, OF CHICAGO, ILLINOIS, ASSIGNOR TO THE LUXFER PRISM PATENTS COMPANY, OF SAME PLACE.

MACHINE FOR GRINDING PRISM-LIGHTS.

SPECIFICATION forming part of Letters Patent No. 638,189, dated November 28, 1899.

Application filed February 2, 1898. Serial No. 668,887. (No model.)

*To all whom it may concern:*

Be it known that I, FRANK C. SOPER, a citizen of the United States, residing at Chicago, in the county of Cook and State of Illinois, have invented certain new and useful Improvements in Machines for Grinding Prism-Lights, of which the following is a specification.

My invention relates to devices for forming prisms on prism-lights and the like by grinding the surface of the material upon which the prisms are to be formed, and has for its object to provide a new and improved device for this purpose.

My invention is illustrated in the accompanying drawings, wherein—

Figure 1 is a side elevation of a device embodying my invention. Fig. 2 is an end elevation of the same. Fig. 3 is a section on line 3 3, Fig. 1. Fig. 4 is a section on line 4 4, Fig. 1. Fig. 5 is a section on line 5 5, Fig. 1. Fig. 6 is a plan view of a portion of the table upon which the glass is supported. Fig. 7 is a side view of a portion of one of the wheels, showing a preferred construction.

Like letters refer to like parts throughout the several figures.

It has heretofore been the custom in forming prism-lights to mold such prism-lights, the prisms thereon being formed by means of the mold. When these prism-lights are molded, it is necessary to make them small in order to get the best results. In my present invention I have shown a means for grinding the prisms instead of molding them, and by this means the prism-lights may be made of any desired size. For example, one prism-light may be made of such size as to fill the entire window, if desired, and thus obviate, among other things, the necessity of joining a number of small pieces together. I have illustrated a simple form of my device in the drawings.

Referring now to Fig. 1, I provide a table A, movably mounted in any suitable manner and adapted to be moved backward and forward past the grinding-wheels $A'$ $A^2$ $A^3$. These grinding-wheels are provided with grinding projections B B, which engage the surface of the glass or other material as it is moved past the wheels and grind it away, so as to form the prisms thereon. A single wheel—such, for example, as shown in Fig. 5—may be used, if desired; but I prefer to use a series of grinding-wheels, one following the other, the projections on said wheels being formed so that each takes a portion of the cut, thereby relieving the strain proportionately. When a single wheel having grooves the exact shape of the prisms to be cut is used, the grooves in the wheel soon lose their shape on account of the excessive and unequal wear in different parts of the cross-section. In the preferred form of my machine this difficulty is overcome by using a series of wheels adapted to successively act upon the glass, the wheel making the first cut being provided with small grooves and having grinding-surfaces, which need not be of proper shape to form the prisms, but which are preferably adapted to remove the bulk of the glass between the prisms. The next wheel is provided with grooves more nearly approaching the shape of the prisms, and the last wheel is provided with grooves having the proper shape of the prisms. As the great bulk of material has been removed before this last wheel is brought into play, it will be seen that the wear may be made substantially equal on the cutting edges, and hence the proper shape may be easily preserved. This construction is shown in Figs. 3, 4, and 5, the grinding projections B increasing in depth, as shown. These grinding-wheels may be operated in any desired manner—as, for example, by means of pulleys C. Associated with each wheel is a hopper or other device D, through which sand and water or other material are discharged upon the wheel during its operation, so as to aid in the grinding of the glass. These are provided with means for controlling the quantity of material deposited on the wheel.

The table A is preferably mounted so that it may be reciprocated and so that it or the glass may also be moved laterally, so that when one cut has been made the glass may be moved to allow a second cut, thus permitting large pieces of glass to be ground with comparatively narrow wheels. This table A may be mounted in any suitable manner and, as shown in the drawings, rests upon the guides E, connected with the supporting-frame E'. A wire rope or the like E² is connected with the table A and passes around the idlers E³ at the ends of the supporting-frame, said rope or other device being wound upon the drum F, provided with a controlling-handle F'. By rotating the drum F the table A may be reciprocated. The supporting-frame E' may be given a lateral movement, if desired, by any suitable mechanism.

The table A is provided with any suitable holding device for holding the glass or other material in position. As shown in the drawings, a rod H fits in a slot or groove near the center of the table and is connected at its end with the cross-bar H'. A sleeve H² is movably connected with said rod and is fastened thereto by means of the set-screw H³. A cam-shaped lever H⁴ is connected with the sleeve H² and adapted to bear against the edge of the table. The front edge of the table is also provided with an upwardly-projecting ledge or rib H⁵. The material to be ground is placed between the rib H⁵ and the cross-piece H', and the rod H is then drawn out until the glass or other material can be easily slipped into position. The set-screw is then tightened, and when the glass is in position the lever H⁴ is moved inwardly, thereby forcing the rod H outwardly, so as to clamp the glass in place. By making the glass-clamping device in this form the glass can be quickly and easily clamped and unclamped, so that the glass itself may be moved laterally across the face of the table instead of moving the table laterally when it is desired to place the glass in position for another cut. It is of course evident that any of the ordinary means for obtaining a relative lateral movement between the cutting-wheel and the glass may be used for this purpose. I have not shown such means for the reason that I have here attempted to show a simple construction, omitting all details not essential to an understanding of my invention. It is of course evident that the grinding-wheels might be moved along the glass instead of moving the table, as herein shown. When the device is in operation, the grinding-wheels are rotated and then the glass moved along beneath them, sand and water or the like being discharged upon the wheels, so as to aid in grinding the glass. The table may be provided with a pan or the like I, adapted to catch the material passing through the hoppers D. I prefer to provide the grinding-wheels with grooves J, (see Fig. 7,) which extend across the face of the wheel and which receive the sand or other material when the wheel is in operation. When the prisms are formed by the grinding-wheels, the surface of course is in the nature of a ground-glass surface and may be polished by means of polishing-wheels having grooves shaped to receive the prisms. Of course any other means for getting rid of the ground-glass effect may be used.

The wheels are preferably provided with some means for changing the distance between their periphery and the table upon which the glass is held to allow for the wear of the wheels and to regulate the depth of the cut. Any suitable means may be used for this purpose. As illustrated in the drawings, I provide the shafts A⁶, upon which the grinding-wheels are mounted, with adjustable bearings A⁷, so that the shaft, and hence the wheels, may be moved to and from the table carrying the glass.

I have shown a simple construction of my device in order to make its application clear; but I desire to have it understood that the several parts may be greatly varied in form, construction, and arrangement without departing from the spirit of my invention, and I do not therefore wish to be limited by the construction shown.

I claim—

1. A device for forming prisms on light-transmitting material comprising a rotary grinding-wheel provided with grinding projections adapted to cut away the material so as to form the prisms, means for supplying grinding material to said wheel, a table upon which the material is fastened, and means for moving said table and wheel with relation to each other.

2. A device for forming prisms on light-transmitting material, comprising a series of rotary wheels placed one behind the other, said wheels provided with grinding projections varying in shape so that the work of forming the complete prisms is distributed over all of the wheels.

3. A device for grinding prism-lights, comprising a series of rotary wheels placed one following the other, said wheels provided with grinding projections, the grinding projections on the successive wheels increasing in depth, a table upon which the material is fastened, means for moving said table beneath the wheels, and a discharging device associated with each wheel adapted to discharge suitable material thereon.

4. A device for forming prisms on light-transmitting material, comprising a series of rotary wheels placed one following the other, said wheels provided with grinding projections, the grinding projections on the successive wheels increasing in depth, so that the work is distributed over the several wheels, each wheel provided with grooves extending across the periphery thereof so as to break up the grinding projections into sections.

FRANK C. SOPER.

Witnesses:
DONALD M. CARTER,
HOMER L. KRAFT.